United States Patent
Rab et al.

(10) Patent No.: US 10,497,268 B2
(45) Date of Patent: Dec. 3, 2019

(54) SYSTEM AND METHOD FOR VIRTUAL FLIGHT INTERVAL MANAGEMENT

(71) Applicant: Honeywell International Inc., Morris Plains, NJ (US)

(72) Inventors: Abdur Rab, Bangalore (IN); Prashanth Thirumalaivenjamur, Bangalore (IN); Arivazhagan V, Bangalore (IN); Umesh Hosamani, Bangalore (IN); Sujith Kumar, Mavelikara (IN)

(73) Assignee: Honeywell International Inc., Morris Plains, NJ (US)

( * ) Notice: Subject to any disclaimer, the term of this patent is extended or adjusted under 35 U.S.C. 154(b) by 458 days.

(21) Appl. No.: 15/384,389

(22) Filed: Dec. 20, 2016

(65) Prior Publication Data
US 2018/0174471 A1 Jun. 21, 2018

(51) Int. Cl.
*G08G 5/00* (2006.01)
*G06F 16/29* (2019.01)
*G08G 5/04* (2006.01)

(52) U.S. Cl.
CPC .......... *G08G 5/0043* (2013.01); *G06F 16/29* (2019.01); *G08G 5/003* (2013.01); *G08G 5/0008* (2013.01); *G08G 5/0013* (2013.01); *G08G 5/0021* (2013.01); *G08G 5/0026* (2013.01); *G08G 5/0047* (2013.01); *G08G 5/0082* (2013.01); *G08G 5/045* (2013.01)

(58) Field of Classification Search
USPC ........................................................ 701/121
See application file for complete search history.

(56) References Cited

U.S. PATENT DOCUMENTS

| 7,437,225 B1 | 10/2008 | Rathinam |
| 8,108,133 B2 * | 1/2012 | Haissig ................ G08G 5/0008 701/116 |
| 8,380,367 B2 | 2/2013 | Schultz et al. |
| (Continued) | | |

FOREIGN PATENT DOCUMENTS

| EP | 2 975 595 A2 | 1/2016 |
| WO | 2015/047174 A1 | 4/2015 |
| WO | 2015/047182 A1 | 4/2015 |

OTHER PUBLICATIONS

Daniel S. Hicok et al., "Concept of Operations for Interval Management Arrivals and Approach", American Institute of Aeronautics and Astronautics, AIAA Guidance, Navigation, and Control Conference, Jan. 4, 2016, XP55474157, 12 pages.

*Primary Examiner* — James M McPherson
(74) *Attorney, Agent, or Firm* — Bookoff McAndrews, PLLC (57) ABSTRACT

A method is provided. The method comprises: identifying a vehicle; providing, to a remote processing system, an interval between the vehicle and a preceding vehicle; providing, to the remote processing system, the preceding vehicle identifier; obtaining, on the remote processing system, a location and a direction of the vehicle; obtaining, on the remote processing system, a location and a direction of the preceding vehicle; determining, on the remote processing system, a speed of the vehicle necessary to maintain the interval; and providing, to the vehicle from the remote processing system, the speed of vehicle necessary to maintain the interval.

14 Claims, 5 Drawing Sheets

(56) References Cited

U.S. PATENT DOCUMENTS

| | | | |
|---|---|---|---|
| 8,437,949 B2 * | 5/2013 | Weitz | G08G 5/0043 |
| | | | 701/120 |
| 8,566,012 B1 | 10/2013 | Shafaat et al. | |
| 9,418,562 B2 * | 8/2016 | Frolik | B64D 45/00 |
| 2009/0319101 A1 | 12/2009 | Coulmeau | |
| 2010/0152996 A1 | 6/2010 | Blanchon et al. | |
| 2012/0072089 A1 * | 3/2012 | Nemoto | G08G 1/22 |
| | | | 701/96 |
| 2014/0249701 A1 | 9/2014 | Latsu-Dake et al. | |
| 2016/0046387 A1 * | 2/2016 | Frolov | H04B 7/18506 |
| | | | 244/59 |
| 2016/0210851 A1 * | 7/2016 | Oshima | G08G 1/0125 |
| 2017/0032402 A1 * | 2/2017 | Patsiokas | G06Q 30/0266 |

* cited by examiner

SYSTEM AND METHOD FOR VIRTUAL FLIGHT INTERVAL MANAGEMENT

BACKGROUND

Air traffic controllers direct a pilot to maintain a fixed spacing or interval, in time or distance, between their aircraft and a specified, preceding aircraft, e.g. when both aircraft are on the same landing approach to an airport. Air traffic controllers periodically need to instruct aircraft to slow down or speed up to maintain the interval. This is a burden on both the air traffic controllers who must provide updated instructions to aircraft pilots. Because such information is not provided in real time, aircraft may travel too fast, and thus having inadequate spacing with the proceeding aircraft. This increases the risk of an accident. Also, it is not efficient, as air traffic controllers have to divert such aircraft whose interval is too small, and forcing the aircraft to recommence its landing approach.

To help automate this process, aircraft are being equipped with automatic dependent surveillance-broadcast transmitters (ADS-B Out) which broadcast aircraft speed, direction, and position to receivers (ADS-B In) in aircraft and one the ground. Aircraft equipped with ADS-B In are made aware of the presence and location of other nearby aircraft using ADS-B Out. For aircraft equipped with it, ADS-B In provides a backup for traffic alert and collision avoidance systems. Also, ADS-B In provides guidance for pilots landing aircraft in a paired approach, with another aircraft, to two closely spaced runways.

Some aircraft are equipped with flight deck interval management (FIM) systems in addition to ADS-B In. In landing approaches, the FIM system generates, in real time, the speed at which the aircraft should fly to maintain the mandated interval, which better permits a pilot to maintain the interval.

Some aircraft, however, are not equipped with a FIM system, and thus cannot benefit from FIM. This undermines the desired safety and efficiency improvements made available by ADS-B Out. Therefore, there is a need to allow aircraft lacking a FIM system to benefit from FIM.

SUMMARY

A method is provided. The method comprises: identifying a vehicle; providing, to a remote processing system, an interval between the vehicle and a preceding vehicle; providing, to the remote processing system, the preceding vehicle identifier; obtaining, on the remote processing system, a location and a direction of the vehicle; obtaining, on the remote processing system, a location and a direction of the preceding vehicle; determining, on the remote processing system, a speed of the vehicle necessary to maintain the interval; and providing, to the vehicle from the remote processing system, the speed of vehicle necessary to maintain the interval.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments. Reference characters denote like elements throughout figures and text.

DETAILED DESCRIPTION

In the following detailed description, reference is made to the accompanying drawings that form a part hereof, and in which is shown by way of illustration specific illustrative embodiments. However, it is to be understood that other embodiments may be utilized and that structural, mechanical, and electrical changes may be made. Furthermore, the method presented in the drawing figures and the specification is not to be construed as limiting the order in which the individual steps may be performed. The following detailed description is, therefore, not to be taken in a limiting sense.

A virtual flight deck interval management system may be used to overcome the above referenced problem. The embodiments of the virtual flight interval system have at least one advantage. A vehicle lacking a flight interval management (FIM) system, but having access to a virtual FIM (VFIM) system, can receive real time speed updates to permit the vehicle to maintain a fixed interval from a preceding aircraft. Although the present invention is sometimes exemplified with aircraft, it is envisioned that it can be used in other vehicles including without limitation automobiles, buses trains, and ships.

Figure 1:
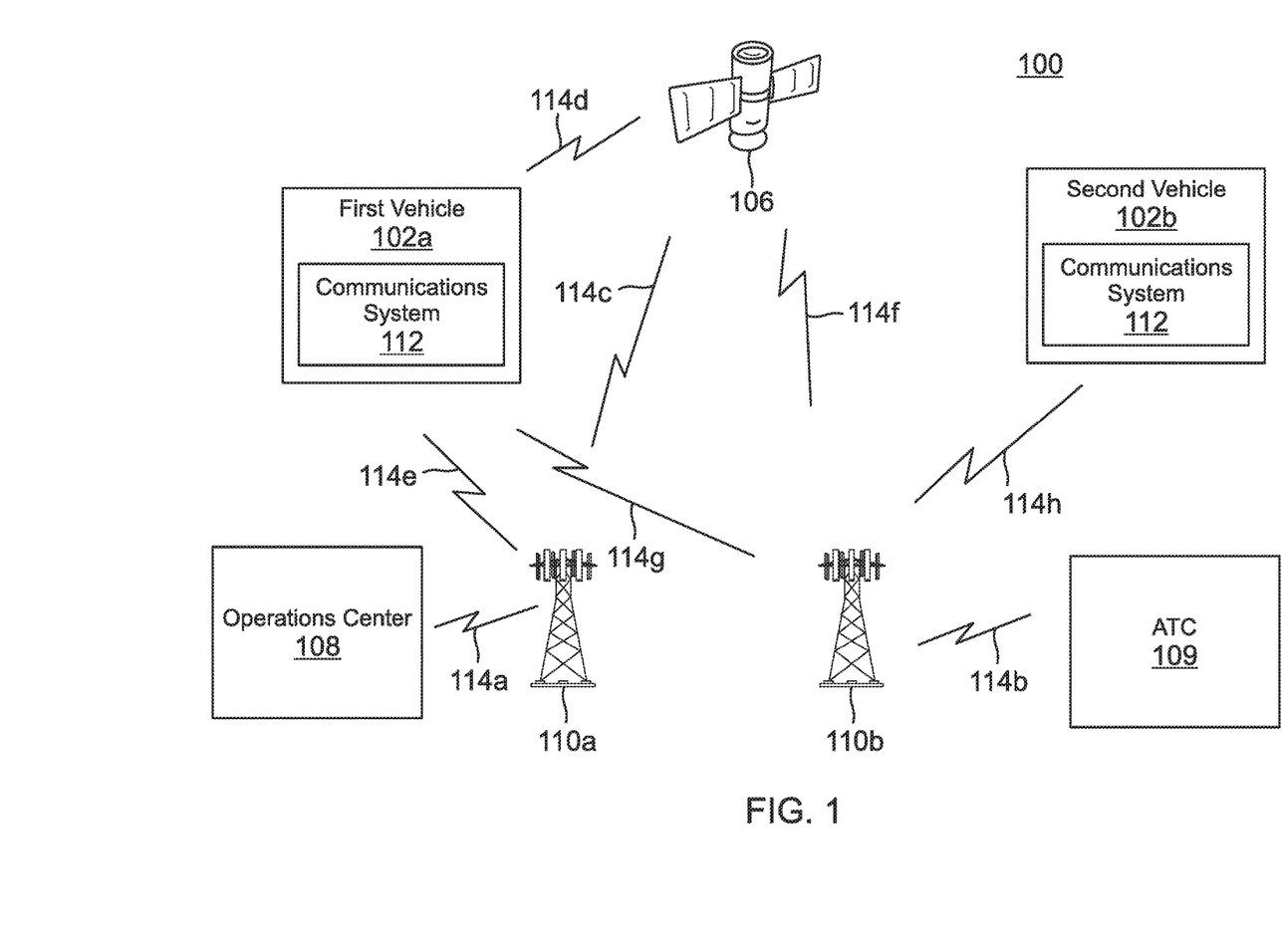
FIG. 1 illustrates a diagram of an exemplary virtual flight interval management system network.

FIG. 1 illustrates a diagram of an exemplary virtual flight interval management system network 100. In one embodiment, virtual flight interval management system network 100 comprises a first vehicle 102a, a second vehicle 102b, an operations center 108, a first ground station 110a, a second ground station 110b, an air traffic control center (ATC) 109, and a satellite 106. Each of the first vehicle 102a and the second vehicle 102b includes a communications system 112.

In one embodiment, the operations center 108 and the first ground station 110a are coupled by a communications link 114a. In another embodiment, the air traffic control center 109 and the second ground station 110b are coupled by a communications link 114b. In a further embodiment, the first ground station 110a is coupled to the first vehicle 102a through the satellite 106 through respective communications links 114c, 114d. In yet another embodiment, the first ground station 110a is coupled to the first vehicle 102a through communications link 114e. In yet a further embodiment, the second ground station 110b is coupled to the first vehicle 102a through the satellite 106 through respective ground links 114f, 114d. In another embodiment, the second ground station 110b is coupled to the first vehicle 102a through communications link 114g. In a further embodiment, the second ground station 110b is coupled to the second vehicle 102b by a communications link 114h. The communication links 114a-h, as is appropriate, may each be one or more of HF or VHF radio networks, SATCOM networks, fiber optic network, cellular network, and any other type of communications system.

In one embodiment, the air traffic control center 109 instructs the first aircraft 109a to prepare to land after the second aircraft 109b while maintaining a fixed interval between the two aircraft. Thus, in another embodiment, the air traffic control center 109 provides to the first aircraft an identifier for the second aircraft 109b and the interval. In a further embodiment, the identifier and interval may be provided verbally or by a text message by the air traffic control center, and received through the communications system 112 of the first vehicle 102a. In yet another embodiment, the identifier and interval may be received, e.g. by text message, indirectly from the air traffic control center 109. In yet a further embodiment, a remote source of such information is the US Federal Aviation Administration's (FAA's) system wide information management (SWIM) system.

Figure 2:
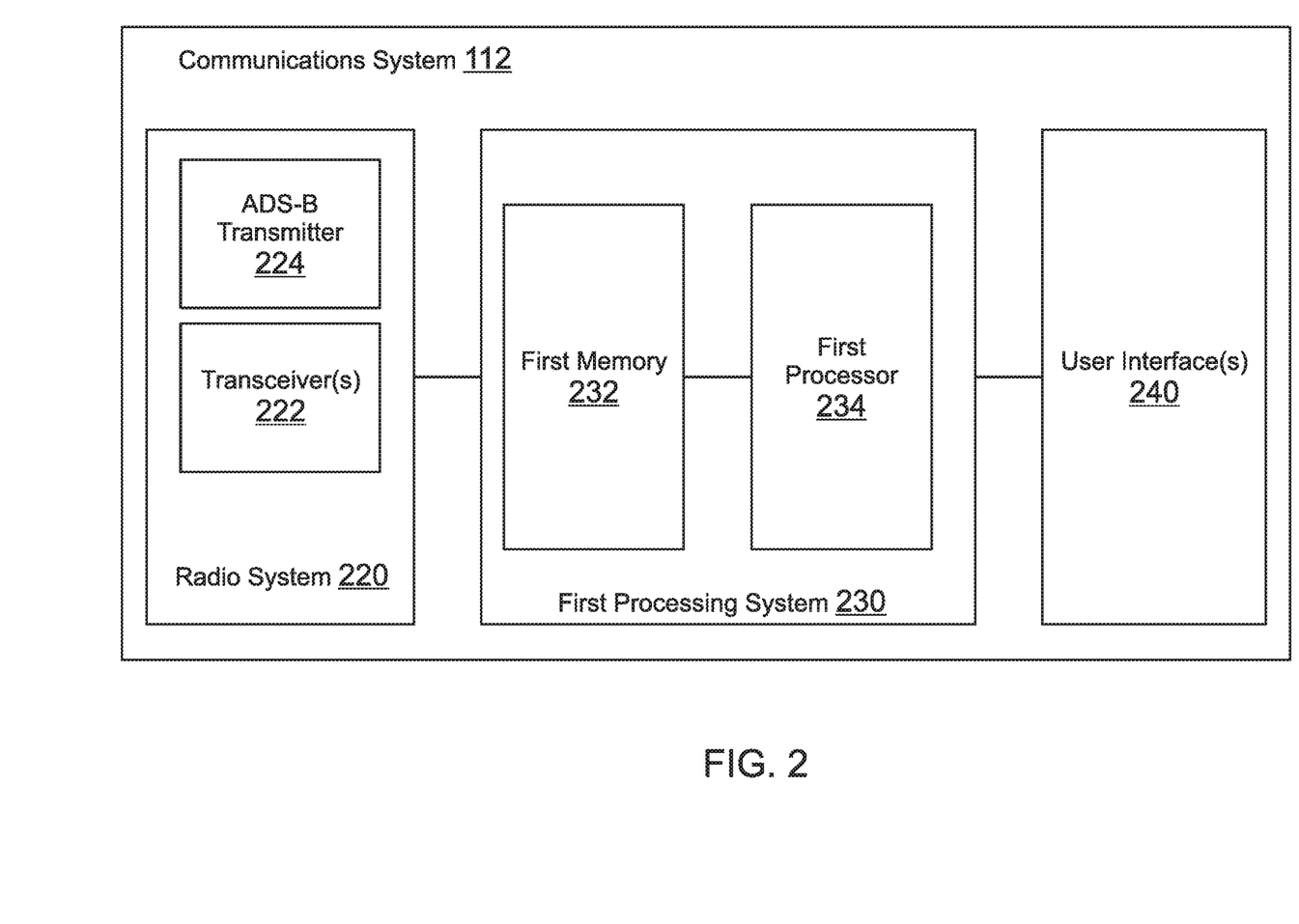
FIG. 2 illustrates a block diagram of an exemplary communications system.

FIG. 2 illustrates a block diagram of an exemplary communications system 112. The communications system 112 comprises a radio system 220, a first processing system 230, and one or more user interfaces 240. The processing system 230 comprises a first memory 232 coupled to a first processor 234. The processing system 230 is coupled to the radio system 220, and the one or more user interfaces 240.

The radio system 220 comprises an ADS-B transmitter 224 and one or more transceivers 222, e.g. HF, VHF, satellite communications, cellular network and/or any other communications transceivers. The transmitter and transceivers mentioned herein include all necessary components, including antenna(s), to facilitate proper operation.

Each ADS-B transmitter 220 periodically transmits the corresponding aircraft's position, speed, direction and the corresponding time of such data (collectively ADS-B Out data). In one embodiment, such ADS-B Out data may be received, through communication links, by a ground station 110, or a satellite 106, and relayed to the air traffic control center 109. In another embodiment, such ADS-B Out may be provided to a remote source of such information, such as the US FAA's SWIM system or the operations center 108, e.g. by such communication links. In a further embodiment, such ADS-B Out data may be received by ADS-B receiver(s) in nearby aircraft.

In the instant example, the first aircraft 102a lacks a flight deck interval management (FIM) system, and possibly even an ADS-B receiver. However, the first aircraft 102a receives speed information necessary to maintain the interval and generated by a virtual FIM system residing in a remote processing system, e.g. in the operations center 108.

In one embodiment, the owner or operator of the first vehicle 102a subscribes, to the virtual FIM system, so as to be able to receive such speed information. Thus, the first vehicle 102a is subscribed to use the virtual FIM system.

Figure 3:
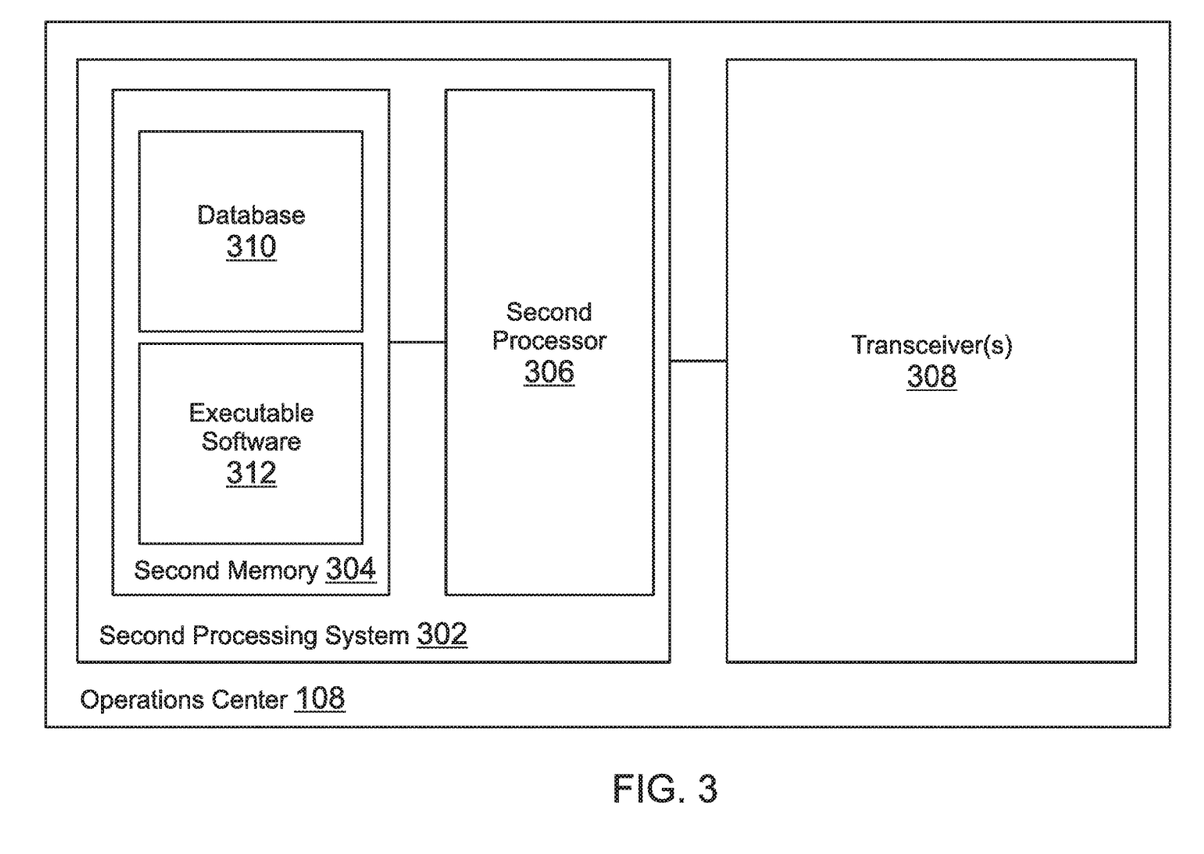
FIG. 3 illustrates a block diagram of an exemplary operations center including a virtual flight deck interval management system.

FIG. 3 illustrates a block diagram of an exemplary operations center 108 including a virtual flight deck interval management system. The operations center 108 includes a second processing system (remote processing system) 302 coupled to one or more transceivers 308. The operations center 108, and thus the second processing system 302, is remotely located from the first vehicle 102a and the second vehicle 102b. The second processing system 302 comprises the virtual flight deck interval management system. The one or more transceivers 308 may be HF, VHF, SATCOM, cellular network, Ethernet, wireless local area network, and/or any other type of transceiver.

In one embodiment, the second processing system 302 includes a second memory 304 coupled to a second processor 306. In another embodiment, the second memory 304 includes virtual flight interval management system database (database) 310 and executable software 312. The executable software 312 processes the data on the second processor 306 in the database 310 to generate the speed. Thus, the second processing system 302 calculates the speed of the first vehicle 102a necessary to maintain the interval with the second vehicle 102b. In another embodiment, the second processing system 302 (or remote processing system) may be accessed through the Internet, and may be referred to as a cloud computing system. In a further embodiment, the remote processing system may be comprised of one or more servers. The remote processing system 302 is not located in the vehicle 102a to whom the calculated speed is provided; in other words, the remote processing system 302 is remotely located from the vehicle 102a to whom the calculated speed is provided.

However, it is contemplated that second processing system 302 could be implemented in alternative ways. For example, the rather than using a database 310, the data in the database 310 could be stored in files. Further, rather than use a second processor 306, and possibly the executable software 312, a state machine or another processing device could be used to process the data.

In one embodiment, upon receiving the interval and the identifier of the second vehicle 102b, the operations center 108 calculates the desired speed of the first vehicle 102a, e.g. with the processing system 302. This will be described further subsequently. Then the operations center 108, e.g. through the one or more transceivers 308, transmits that speed to the first vehicle 102a.

In one embodiment, the operations center 108 and aircraft traffic control center 109 are distinct. In another embodiment, the air traffic control center 109 includes the operations center 108.

Figure 4:
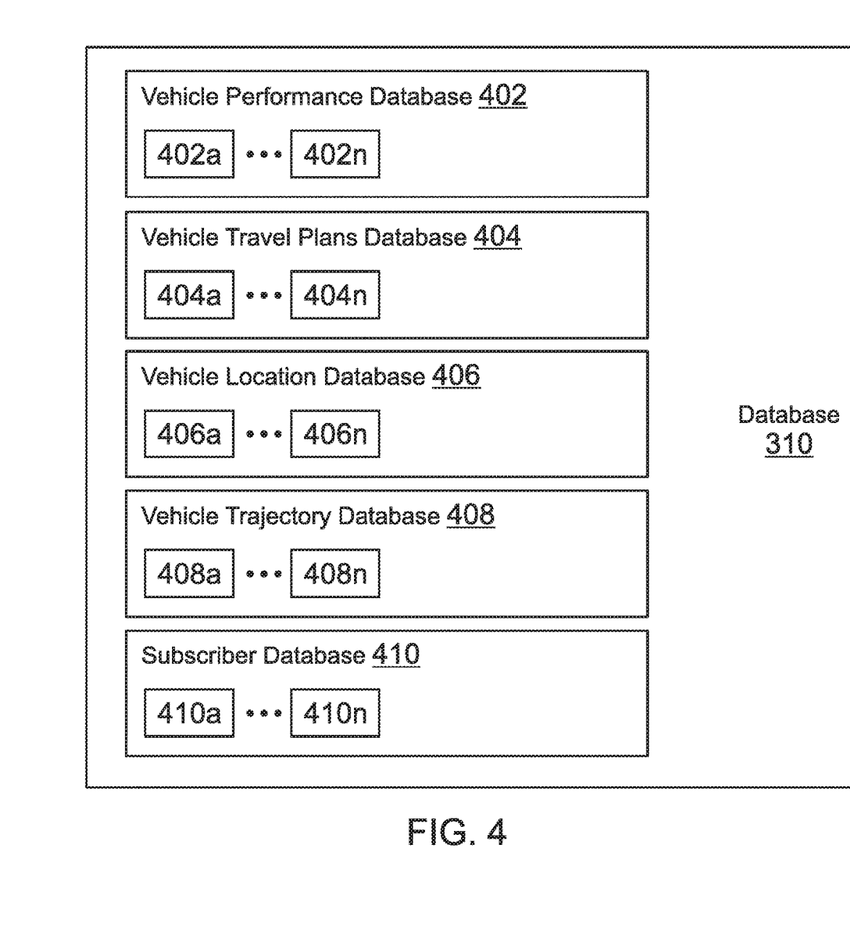
FIG. 4 illustrates an exemplary virtual flight deck interval management system database.

FIG. 4 illustrates an exemplary embodiment of the virtual flight interval management system database 310. In one embodiment, the exemplary virtual flight interval management system database 310 includes sub-databases. In another embodiment, data can be stored in a single database.

The virtual flight interval management system database 310 includes one or more of a vehicle performance database 402, a vehicle travel plans database 404, a vehicle location database 406, a vehicle trajectory database 408, and a subscriber database 410. In one embodiment, the vehicle performance database 402 includes one or more vehicle performance databases 402a . . . n. In another embodiment, the vehicle travel plans database 404 includes one or more vehicle travel plans databases 404a . . . n. In a further embodiment, the vehicle location database 406 includes one or more vehicle location databases 406a . . . n. In yet another embodiment, the vehicle trajectory database 408 includes one or more vehicle trajectory databases 408a . . . n. In yet a further embodiment, the subscriber database 410 includes one or more subscriber databases 410a . . . n.

Each of the one or more vehicle performance databases 402a . . . n, includes characteristics of a unique type of vehicle. Such vehicle characteristics may include, e.g. for an aircraft, range, gross and empty weight, rate of climb, fuel capacity, maximum speed, fuel burn rate, ground roll at takeoff and landing, and typical indicated airspeed or true airspeed, e.g. at different flight levels.

Each of the one or more vehicle travel plans databases 404a . . . n includes the contents of travel plans for a unique vehicle. In one embodiment, the one or more vehicle travel plans databases 404a . . . n may be limited to vehicles traveling in one or more geographic regions. In another embodiment, the one or more vehicle travel plans databases 404*a* . . . *n* comprise travel plans of the vehicle and vehicles proximate to the vehicle.

In one embodiment, the vehicle travel plan is provided, e.g. to a governmental entities of the regions and/or countries where the vehicle will be travelling, by the owner or operator of the vehicle. In another embodiment, the vehicle travel plan is provided by the owner or operator of the vehicle prior to the vehicle's departure. For example, when the vehicle is an aircraft, the airline or pilot submits the vehicle travel plan, i.e. an aircraft flight plan, to governmental entities, e.g. the US FAA, of the regions and/or countries over which the aircraft will travel. In a further embodiment, the vehicle travel plan is obtained by the second processing system 302, e.g. the database 310, from a service like the US FAA's SWIM service.

In one embodiment, each vehicle travel plan includes an identifier of the vehicle, information about the vehicle (e.g. manufacturer and type of vehicle, color and any special equipment on the vehicle), expected speed of the vehicle, departure location (or departure terminal) and time, information about travel path (e.g. for aircraft: cruising altitude, airways, and waypoints), and arrival location(s) (or destination(s) or terminal(s)) and time, estimated time en route, fuel on board, alternate arrival locations (or destination(s) or terminal(s)) in case of inclement weather, type of travel (e.g. for aircraft: whether instrument flight rules (IFR) or visual flight rules (VFR) apply), information about the operator of the vehicle (e.g. pilot), and number of people on board the vehicle. The term 'travel information' shall mean the expected speed of the vehicle, the departure location (or departure terminal) and time, the information about travel path (e.g. for aircraft: cruising altitude, airways, and waypoints), the arrival location(s) (or destination(s) or terminal(s)) and time, estimated time en route, and fuel on board.

Each of the one or more vehicle location databases 406*a* . . . *n* includes the location of a unique vehicle at an instant in time. In one embodiment, the one or more vehicle travel location databases 406*a* . . . *n* may be limited to vehicles traveling in the one or more geographic region. In another embodiment, the location information is obtained directly by the second processing system 302, e.g. the database 310, from a vehicle location broadcast system such as ADS-B Out, or indirectly through a service like the US FAA's SWIM service. In a further embodiment, each of the travel location databases 406*a* . . . *n* includes the vehicle speed and direction of travel at the same time instant. In yet another embodiment, the vehicle location database which comprises location and direction of travel data of the vehicle and vehicles proximate to the vehicle.

Each of the one or more vehicle trajectory databases 408*a* . . . *n* includes the trajectory of a unique vehicles. A vehicle trajectory is a detailed three-dimensional position of the vehicle with respect to time. In one embodiment, the one or more vehicle trajectory databases 408*a* . . . *n* may be limited to vehicles travelling in the one or more geographic regions. In another embodiment, the vehicle trajectories are generated by the processing system 230 by using the travel path information in the vehicle travel plan, and the vehicle performance database for the corresponding vehicle, to determine the vehicle's trajectory.

Each of the one or more subscriber databases 410*a* identifies information about the vehicles permitted to use, e.g. whose owners or operators subscribe to, the virtual FIM system. In one embodiment, each such database includes a subscriber identifier, the vehicle manufacturer and type, and a vehicle identifier (e.g. a tail number). In another embodiment, each such database includes the interval, and an identifier for the preceding second vehicle 102*b*. In a further embodiment, the one or more subscriber databases 410*a* identify information about the owners or operators who subscribe to the virtual FIM system. In yet another embodiment, the subscriber information is used, e.g. by the remote processing system, to validate whether a vehicle can use the virtual FIM service provided by the remote processing system. In another embodiment, the remote processing system processes data in the one or more subscriber databases 410 to ascertain if a vehicle, or owner or operator of a vehicle, is subscribed to the virtual FIM service.

Figure 5:
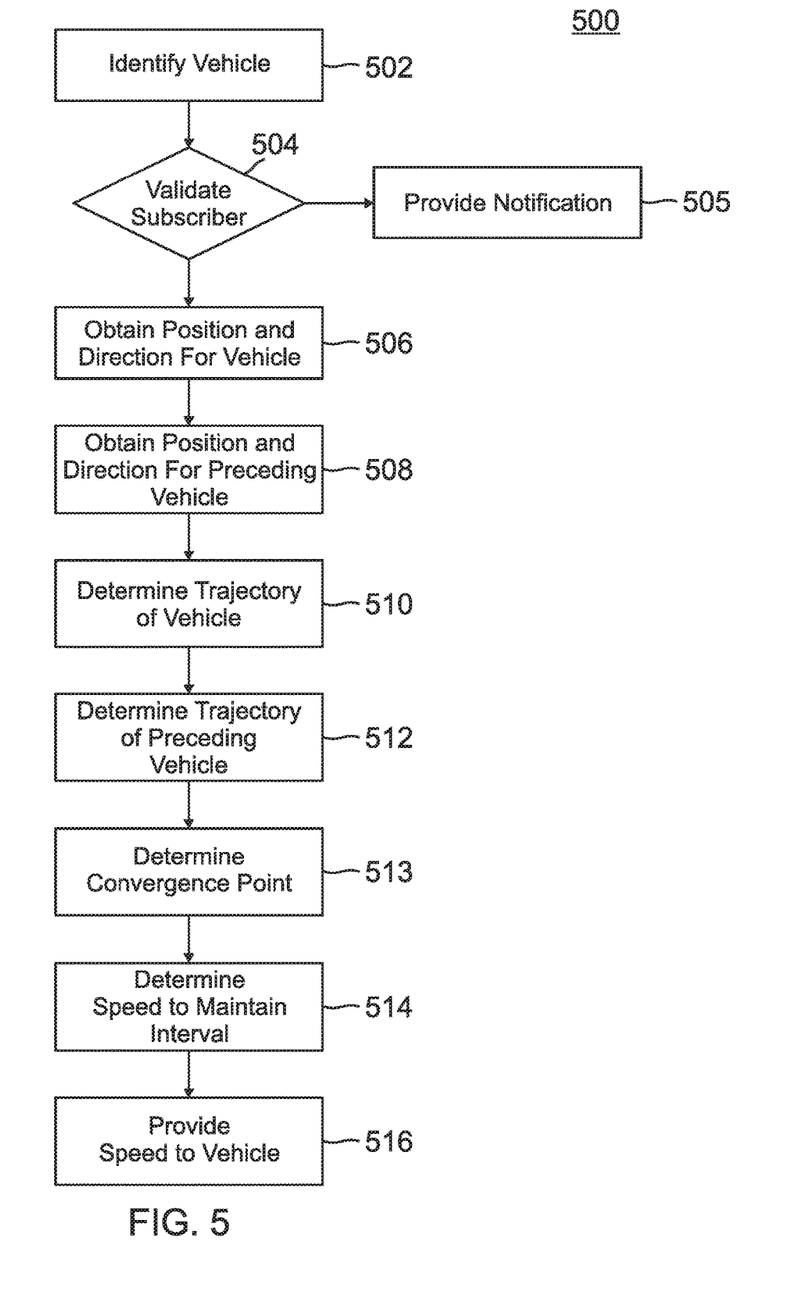
FIG. 5 illustrates an exemplary method of operation of a virtual flight deck interval management system.

FIG. 5 illustrates an exemplary method 500 of operation of a virtual flight deck interval management system. The embodiment of method 500 shown in FIG. 5 is described here as being implemented in the systems shown in the preceding Figures, though it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

In block 502, identify a vehicle, e.g. the first vehicle 102*a*, seeking to use the VFIM service. In one embodiment, the vehicle issues a request for VFIM service, e.g. to a remote processing center such as the operations center 108. In another embodiment, the service request includes an identifier of the first vehicle 102*a*, an identifier of the second vehicle 102*b* (or preceding vehicle), which should arrive at a common destination, e.g. a runway prior to the first vehicle 102*a*, and an interval. In a further embodiment, the identifier for the vehicle may include a vehicle owner name, a vehicle operator name, a tail number, flight number, and/or a VFIM service subscriber number. The identifier of the preceding vehicle may include a tail number or a flight number. In yet another embodiment, one or more of the identifiers of the vehicle, the identifiers of the preceding vehicle, and the interval are provided by another remote system, such as the US FAA's SWIM system, to the remote processing system. In yet a further embodiment, the remote system requests such information from the other remote system.

In one embodiment, the interval may change periodically, and is correspondingly provided to the remote system. The remote processing system correspondingly adjusts the speed necessary to maintain the revised interval as further described herein.

In one embodiment, no VFIM service request is required. The identifier of the vehicle, the identifier of the preceding vehicle, and the interval are obtained, e.g. by the remote processing system 302, from another remote system, e.g. from the US FAA's SWIM system.

In one embodiment, the following steps are automatically undertaken for VFIM system subscribers or participants. In block 504, validate that the first vehicle 102, or its owner or operator, is a subscriber to or participant in the VFIM system service, e.g. with the remote processing system 302. In another embodiment, the remote processing system 302 compares the received identifier of the first vehicle 102*a*, such as a subscriber number, with the subscriber database 410. If subscription is validated, proceed to block 506. If the subscription is not validated, then in block 505 provide notification to the vehicle that subscription is not valid. In a further embodiment, cease providing VFIM services to the vehicle.

In block 506, obtain, on the remote processing system, a location and direction of the vehicle 102a, e.g. received from ADS-B Out transmissions. In one embodiment, such vehicle direction and location are stored in the remote processing system 302, e.g. in the database 310, and later obtained from the remote processing system 302, e.g. in the database 310. In another embodiment, obtain position, travel plan and performance data for the vehicle 102a, e.g. from the US FAA's SWIM system. In a further embodiment, such position, travel plan and performance data for the vehicle 102a is stored in the remote processing system 302, e.g. in the database 310, and later obtained from the remote processing system 302, e.g. from the database 310.

In block 508, obtain, on the remote processing system, a location and direction of the preceding vehicle, e.g. received from ADS-B Out transmissions. In one embodiment, such preceding vehicle direction and location are stored in the remote processing system 302, e.g. in the database 310, and later obtained from in the remote processing system 302, e.g. from the database 310. In another embodiment, obtain position, travel plan and performance data for the preceding vehicle 102b, e.g. from the US FAA's SWIM system. In a further embodiment, such position, travel plan and performance data for the preceding vehicle 102b is stored in the remote processing system 302, e.g. in the database 310, and later obtained from in the remote processing system 302, e.g. from the database 310.

In block 510, determine a trajectory of the vehicle 102a, e.g. as described above. In block 512, determine a trajectory of the preceding vehicle 102b, e.g. as described above.

In one embodiment, in block 513, if the remaining travel of the vehicle 102a and the preceding vehicle 102b are on differing trajectories that converge, then the remote processing system 302 determines where the trajectories converge (i.e. convergence point).

In block 514 determine speed of the vehicle 102 to maintain the specified interval, e.g. on the remote processing system 302. In one embodiment, if remaining travel of the vehicle 102a and the preceding vehicle 102b are on the same trajectory, calculation of the speed is straightforward, e.g. increasing or decreasing the speed to attain the interval. In another embodiment, if the remaining travel of the vehicle 102a and the preceding vehicle 102b are on differing trajectories that converge, then the remote processing system determines where the trajectories converge (i.e. the convergence point), and increases or decreases the speed to attain the interval at the convergence point and thereafter where the trajectory is common for the vehicle 102a and the preceding vehicle 102b.

In block 516, provide the speed to the vehicle 102a. In one embodiment, update the speed periodically, e.g. every second. In another embodiment, cease updates when the vehicle 102a begins its final approach to its destination, e.g. an airport runway. In a further embodiment, the remote processing system 302 ceases providing the speed to maintain the interval when the vehicle 102a, a vehicle traffic center, or another remote system notifies the remote processing system 302 when the vehicle 102a begins its final arrival approach, e.g. final landing approach.

EXAMPLE EMBODIMENTS

Example 1 includes a system comprising: one or more transceivers; wherein the one or more transceivers are configured to receive an identifier of a preceding vehicle and an interval between a vehicle and the preceding vehicle; a processing system, remotely located from the vehicle and the preceding vehicle, coupled to the one or more transceivers; wherein the processing system is configured to calculate a speed of the vehicle to maintain the interval; and wherein the one or more transceivers are configured to transmit the speed to the vehicle.

Example 2 includes the system of Example 1, wherein the processing system comprises: a memory including a database; and a processor coupled to the memory.

Example 3 includes the system of Example 2, wherein the database comprises at least one of: a vehicle performance database; a vehicle travel plans database; a vehicle location database; a vehicle trajectory database; and a subscriber database.

Example 4 includes the system of Example 3, wherein the database comprises a subscriber database; wherein the processing system is configured, to process data in the subscriber database, to determine whether at least one of the vehicle, a vehicle operator, or a vehicle owner are subscribed to receive the speed; and wherein the processing system is configured to provide the speed to the vehicle only if at least one of the vehicle, the operator of the vehicle, or the owner of the vehicle is subscribed to receive the speed.

Example 5 includes the system of any of Examples 3-4, wherein the database comprises the vehicle performance database and the travel plans database; wherein the vehicle travel plans database comprises a travel plan of the preceding vehicle and a travel plan of the vehicle; wherein the vehicle performance database comprises vehicle characteristics of the preceding vehicle and the vehicle; wherein the processing system is configured to determine the trajectory of the preceding vehicle based upon the travel plan of the preceding vehicle, and the vehicle characteristics of the preceding vehicle; wherein the processing system is configured to determine the trajectory of the vehicle based upon the travel plan of the vehicle, and the vehicle characteristics of the vehicle; and wherein the processing system is configured to calculate the speed of the vehicle to maintain the interval comprises wherein the processing system is configured to calculate the speed of the vehicle to maintain the interval based upon the trajectory of the preceding vehicle and the trajectory of the vehicle.

Example 6 includes the system of Example 5, wherein the processing system is configured to calculate the speed of the vehicle to maintain the interval based upon the trajectory of the preceding vehicle and the trajectory of the vehicle comprises wherein the processing system is configured to calculate the speed of the vehicle to maintain the interval at a convergence point based upon the trajectory of the preceding vehicle and the trajectory of the vehicle.

Example 7 includes the system of any of Examples 3-6, wherein the database comprises the vehicle travel plans database which comprises travel plans of the vehicle and vehicles proximate to the vehicle.

Example 8 includes the system of any of Examples 3-7, wherein the database comprises the vehicle location database which comprises location data of the vehicle and vehicles proximate to the vehicle.

Example 9 includes a method comprising: identifying a vehicle; providing, to a remote processing system, an interval between the vehicle and a preceding vehicle; providing, to the remote processing system, the preceding vehicle identifier; obtaining, on the remote processing system, a location and a direction of the vehicle; obtaining, on the remote processing system, a location and a direction of the preceding vehicle; determining, on the remote processing system, a speed of the vehicle necessary to maintain the interval; and providing, to the vehicle from the remote processing system, the speed of vehicle necessary to maintain the interval.

Example 10 includes the method of Example 9, wherein determining, on the remote processing system, the location and the direction of the vehicle further comprises: obtaining a travel plan and performance data of the vehicle; and determining a trajectory of the vehicle; and wherein determining, on the remote processing system, the location and direction of the vehicle further comprises: obtaining a travel plan and performance data of the preceding vehicle; and determining a trajectory of the preceding vehicle.

Example 11 includes the method of Example 10, further comprising: determining a convergence point of the vehicle and the proceeding vehicle; and wherein calculating, on the remote processing system, the speed of the vehicle necessary to maintain the interval further comprises calculating the speed of the vehicle necessary to maintain the interval at the convergence point.

Example 12 includes the method of any of Examples 10-11, further comprising validating subscribership of one or more of the vehicle, a vehicle owner or a vehicle operator.

Example 13 includes the method of Example 12, wherein validating subscribership of one or more of the vehicle, a vehicle owner or a vehicle operator further comprises ceasing service if the subscribership is not validated.

Example 14 includes the method of any of Examples 10-13, further comprising receiving a virtual flight deck management service request.

Example 15 includes the method of any of Examples 10-14, wherein identifying the vehicle further comprises validating subscribership of one or more of the vehicle, a vehicle owner or a vehicle operator.

Example 16 includes the method of Example 15, wherein validating subscribership of one or more of the vehicle, a vehicle owner or a vehicle operator further comprises ceasing service if the subscribership is not validated.

Example 17 includes a processing system comprising: a memory comprising a database; a processor coupled to the memory; wherein the database comprises at least one of a vehicle performance database, a vehicle travel plans database, a vehicle location database, a vehicle trajectory database, and a subscriber database; wherein the processing system is configured to receive an identifier of a preceding vehicle and an interval between a vehicle and the preceding vehicle; wherein the processing system is remotely located from the vehicle and the preceding vehicle; wherein the processing system is configured to calculate a speed of the vehicle to maintain the interval; and wherein the processing system is configured to provide the speed to the vehicle.

Example 18 includes the processing system of Example 17, wherein the database comprises a subscriber database; wherein the processing system is configured to determine whether at least one of the vehicle, a vehicle operator, or a vehicle owner are subscribed to receive the speed; and wherein the processing system is configured to provide the speed to the vehicle comprises the processing system is configured to provide the speed to the vehicle only if at least one of the vehicle, the operator of the vehicle, or the owner of the vehicle is subscribed to receive the speed.

Example 19 includes the processing system of any of Examples 17-18, wherein the database comprises a vehicle performance database and a vehicle travel plans database; wherein the vehicle travel plans database comprises a travel plan of the preceding vehicle and a travel plan of the vehicle; wherein the vehicle performance database comprises vehicle characteristics of the preceding vehicle and the vehicle; wherein the processing system is configured to determine the trajectory of the preceding vehicle based upon the travel plan of the preceding vehicle, and the vehicle characteristics of the preceding vehicle; wherein the processing system is configured to determine the trajectory of the vehicle based upon the travel plan of the vehicle, and the vehicle characteristics of the vehicle; and wherein the processing system is configured to calculate the speed of the vehicle to maintain the interval comprises wherein the processing system is configured to calculate the speed of the vehicle to maintain the interval based upon the trajectory of the preceding vehicle and the trajectory of the vehicle.

Example 20 includes the processing system of Examples 17-19, wherein the processing system is configured to calculate the speed of the vehicle to maintain the interval based upon the trajectory of the preceding vehicle and the trajectory of the vehicle comprises wherein the processing system is configured to calculate the speed of the vehicle to maintain the interval at a convergence point based upon the trajectory of the preceding vehicle and the trajectory of the vehicle.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A system comprising:
   a remote processing system comprising a processor coupled to one or more databases comprising a vehicle performance database storing vehicle characteristics of a first vehicle and a second vehicle, and a vehicle travel plans database storing a travel plan of the first vehicle and a travel plan of the second vehicle; and
   one or more transceivers coupled to the remote processing system;
   wherein the remote processing system is configured to:
      receive, through the one or more transceivers, an identifier of the first vehicle and the second vehicle, the first vehicle being preceded by the second vehicle;
      receive, through the one or more transceivers, an interval between the first vehicle and the second vehicle;
      obtain, through the one or more transceivers, a location and direction of each of the first vehicle and the second vehicle;
      determine the trajectory of the second vehicle based upon the travel plan of the second vehicle and the vehicle characteristics of the second vehicle;
      determine the trajectory of the first vehicle based upon the travel plan of the first vehicle and the vehicle characteristics of the first vehicle;
      calculate a speed of the first vehicle necessary to maintain the interval based upon the trajectory of the second vehicle and the trajectory of the first vehicle; and
      transmit automatically to the first vehicle, through the one or more transceivers, the speed of the first vehicle necessary to maintain the interval.

2. The system of claim 1, wherein the one or more databases further comprises at least one of:
   a vehicle location database;
   a vehicle trajectory database; and
   a subscriber database.

3. The system of claim 2, wherein the one or more databases comprises a subscriber database;
wherein the remote processing system is configured to process data in the subscriber database, to determine whether at least one of the first vehicle, an operator of the first vehicle, or an owner of the first vehicle are subscribed to receive the speed; and
wherein the remote processing system is configured to provide the speed to the first vehicle only if at least one of the first vehicle, the operator of the first vehicle, or the owner of the first vehicle is subscribed to receive the speed.

4. The system of claim 1, wherein the remote processing system is configured to calculate the speed of the first vehicle necessary to maintain the interval at a convergence point based upon the trajectory of the second vehicle and the trajectory of the first vehicle.

5. The system of claim 1, wherein the vehicle travel plans database comprises travel plans of vehicles in the geographic region of the first vehicle.

6. The system of claim 2, wherein the one or more databases comprising the vehicle location database comprises location data of the first vehicle and vehicles in the geographic region of the first vehicle.

7. A method comprising:
receiving, by a remote processing system, an identifier of a first vehicle and an identifier of a second vehicle, the first vehicle being preceded by the second vehicle;
receiving, by the remote processing system, an interval between the first vehicle and the second vehicle;
obtaining, by the remote processing system, a location and a direction of the first vehicle and the second vehicle;
determining, by the remote processing system, a trajectory of the second vehicle based upon a travel plan of the second vehicle and vehicle characteristics of the second vehicle;
determining, by the remote processing system, a trajectory of the first vehicle based upon a travel plan of the first vehicle and vehicle characteristics of the first vehicle;
calculating, by the remote processing system, a speed of the first vehicle necessary to maintain the interval based upon the trajectory of the second vehicle and the trajectory of the first vehicle; and
providing, to the first vehicle from the remote processing system, the speed of vehicle necessary to maintain the interval.

8. The method of claim 7, further comprising:
determining, by the remote processing system, a convergence point of the first vehicle and the second vehicle; and
wherein calculating, by the remote processing system, the speed of the first vehicle necessary to maintain the interval further comprises calculating the speed of the first vehicle necessary to maintain the interval at the convergence point.

9. The method of claim 7, further comprising validating subscribership of one or more of the first vehicle, an owner of the first vehicle or an operator of the first vehicle.

10. The method of claim 9, wherein validating subscribership of one or more of the first vehicle, an owner of the first vehicle or an operator of the first vehicle further comprises ceasing service if the subscribership is not validated.

11. The method of claim 7, further comprising receiving a virtual flight deck management service request.

12. A processing system comprising:
a processor coupled to a database comprising an aircraft performance database storing aircraft characteristics of a first aircraft and a second aircraft, and an aircraft flight plans database storing a flight plan of the first aircraft and a flight plan of the second aircraft;
wherein the processing system is configured to:
receive, through one or more transceivers, an identifier of the first aircraft and the second aircraft, the first aircraft being preceded by the second aircraft;
receive, through the one or more transceivers, an interval between the first aircraft and the second aircraft;
obtain, through the one or more transceivers, a location and direction of each of the first aircraft and the second aircraft;
determine the trajectory of the second aircraft based upon the flight plan of the second aircraft and the aircraft characteristics of the second aircraft;
determine the trajectory of the first aircraft based upon the flight plan of the first aircraft and the aircraft characteristics of the first aircraft;
calculate a speed of the first aircraft necessary to maintain the interval based upon the trajectory of the second aircraft and the trajectory of the first aircraft; and
provide automatically to the first aircraft, through the one or more transceivers, the speed of the first aircraft necessary to maintain the interval.

13. The processing system of claim 12, wherein the database comprises a subscriber database;
wherein the processing system is configured to determine whether at least one of the first aircraft, an operator of the first aircraft, or an owner of the first aircraft are subscribed to receive the speed; and
wherein the processing system is configured to provide the speed to the first aircraft only if at least one of the first aircraft, the operator of the first aircraft, or the owner of the first aircraft is subscribed to receive the speed.

14. The processing system of claim 12, wherein the processing system is configured to calculate the speed of the first aircraft necessary to maintain the interval at a convergence point based upon the trajectory of the second aircraft and the trajectory of the first aircraft.

* * * * *